Figure 1:
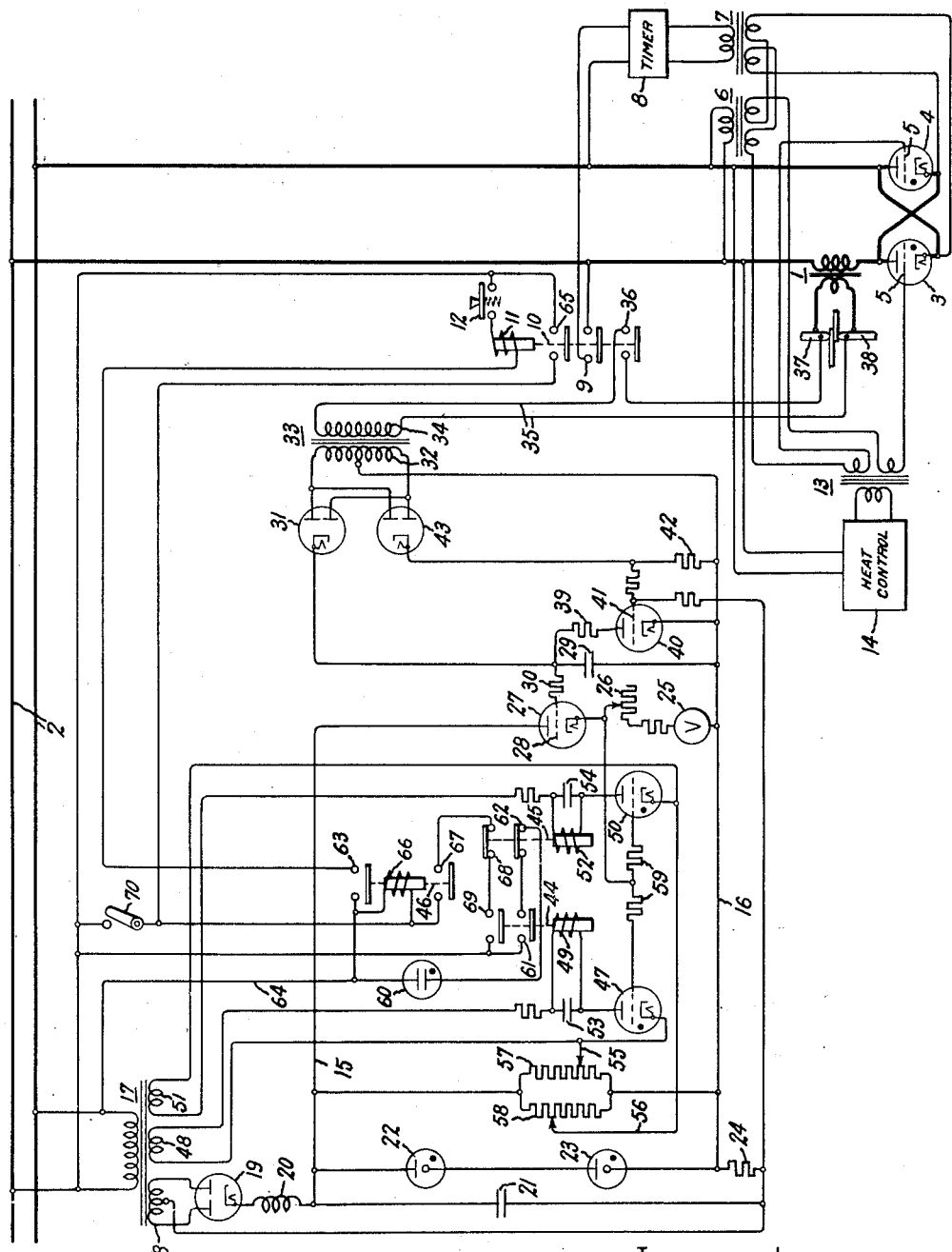

Aug. 19, 1952  B. COOPER ET AL  2,607,893
ELECTRIC CONTROL CIRCUITS
Original Filed May 4, 1944  2 SHEETS—SHEET 2

Inventors:
Benjamin Cooper,
Charl D. Cillié,
by Claude H. Mott.
Their Attorney.

Patented Aug. 19, 1952

2,607,893

UNITED STATES PATENT OFFICE 2,607,893

ELECTRIC CONTROL CIRCUITS

Benjamin Cooper, Scotia, and Charl D. Cillié, Schenectady, N. Y., assignors to General Electric Company, a corporation of New York Original application May 4, 1944, Serial No. 534,082. Divided and this application August 30, 1947, Serial No. 771,526

6 Claims. (Cl. 250—27)

The subject matter hereof, as pointed out in the appended claims, has been divided from our application Serial No. 534,082 for Electric Control Circuits filed May 4, 1944, and now Patent 2,440,932 granted May 4, 1948.

In our above-identified application we have described and claimed new and improved circuits for indicating for each interval of energization, the magnitude of an electrical condition of an intermittently energized load circuit, such as a resistance welding circuit, where, in order to insure a uniform strength of the welds, it is desirable that the current or energy supplied to the material to be welded be the same during each welding operation.

Welding circuits have been provided with regulators for obtaining this result but, nevertheless, circumstances may arise which prevent the regulators from maintaining the welding current at the devised level and for this reason it becomes desirable to indicate to the operator that the proper value of current has not been supplied to a weld and in some cases to shut down the welding machine.

In our above-identified parent application we have described and claimed a circuit in which a capacitor is charged in accordance with the integral with respect to time of the current supplied to the load, or parts being welded, during each period of energization of the load circuit as determined by a timing means. Electronic switching means responsive to said timing means are also provided for charging a second capacitor in accordance with the voltage acquired by the first capacitor during a period of energization of the load circuit. This second capacitor is provided with charging and discharging circuits which are normally rendered ineffective but which in response to the timing means and through the action of the electronic switching means are rendered effective, for an interval of short duration during each period of deenergization of the load circuit, for adjusting the voltage of the second capacitor in accordance with the voltage acquired by the first capacitor during the immediately preceding period of energization of the load circuit. This second capacitor is charged from a direct current supply circuit which also supplies current to an indicating device or meter through an electric valve having its anode-cathode circuit connected in series therewith and its control member connected to said second capacitor to vary the current supplied to the indicating device or meter in accordance with the voltage of the second capacitor.

After each adjustment of the voltage of the second capacitor and after it has been disconnected therefrom, the first capacitor is discharged for recharging in accordance with the time integral current flow during the next period of energization of the load circuit. Since the voltage of the second capacitor is charged only during the initial portion of each deenergization period of the load circuit, the indicating device or meter gives a steady indication during the remainder of this deenergization period and during the next energization period.

It is sometimes desirable to have an indication of the maximum instantaneous value of an electrical condition, such as current or voltage, at the end of an energization period of an intermittently energized load circuit. Thus as described in detail and claimed in Spittler and Johnson application S. N. 534,010, Patent No. 2,577,163 dated December 4, 1951, filed concurrently with our above-identified parent application and assigned to the assignee of the present invention, the voltage across the weld changes during the progress of the weld and the magnitude of this voltage at a particular instant, such as the end of the weld period, provides a good indication of the weld quality.

It is an object of our invention to provide a control circuit in which, during a timed application of current flow in an electric circuit, a capacitor is charged to a voltage dependent upon the maximum instantaneous value of an electrical condition of said circuit while a discharge path in shunt to the capacitor is rendered conductive so that the capacitor charge may be adjusted in either direction as the magnitude of the electrical condition varies and in which during periods of deenergization of said electric circuit the charge on said capacitor is maintained at a value dependent on the maximum instantaneous value of said condition occurring during the last half cycle of energization of said electric circuit.

It is also an object of our invention to provide such a control circuit in which means responsive to the voltage of said capacitor is employed for preventing the initiation of a second application of current to said electric circuit when the value of said condition departs from a predetermined magnitude by a predetermined amount during the last cycle of energization of said electric circuit.

Further objects of our invention and a better understanding thereof may be had by reference to the following description taken in connection with the accompanying drawings and its scope will be pointed out in the appended claims.

Figure 2:
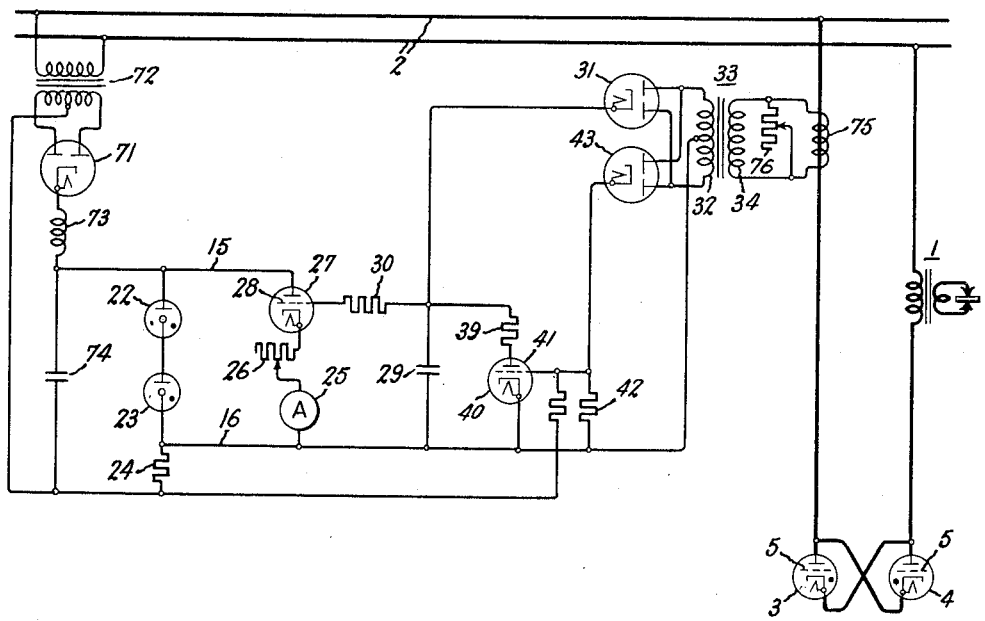

In these drawings Fig. 1 is a schematic representation of one embodiment of our invention and Fig. 2 is a schematic representation of a further embodiment thereof.

In Fig. 1 of the drawings, we have shown our invention as applied to a circuit for obtaining an indication of the voltage across the work at the end of each weld period in accordance with the method described and claimed in the above-mentioned Spittler and Johnson application. As illustrated therein, a resistance welding transformer 1 is connected for energization from an alternating current supply circuit 2 by means of a pair of electric valves 3 and 4 which are reversely connected in parallel to supply alternating current to the load circuit. The electric valves 3 and 4 may be of the type employing an immersion-ignitor control member, or, as illustrated, may include a heated cathode and utilize an ionizable medium such as a gas or a vapor. Each of the electric valves is provided with a control member 5 which is energized to determine the cycles and the instant in each cycle that the associated valve is rendered conductive. The control circuit for controlling the energization of these control members may be of any of the types well known in the art, and has been illustrated as including a transformer 6 for supplying an alternating component of voltage to the control members 5 which is in phase opposition with the anode-cathode voltages thereof and a transformer 7 for supplying a component of alternating voltage to the control members 5 which is in phase with the anode-cathode voltages of electric valves 3 and 4 and which is applied intermittently under the control of a timer control designated generally by the numeral 8. The timer control is energized from the alternating current supply circuit 2 through the normally open contacts 9 of an initiating relay 10, the operating coil 11 of which is in circuit with a normally open initiating switch 12. A third component of voltage is impressed on the control members 5 of electric valves 3 and 4 by a transformer 13. This component of voltage is preferably of peaked wave form and adjustable in phase with respect to the anode-cathode voltage of electric valves 3 and 4, in accordance with the magnitude of the current which it is desired to supply to the load circuit. The relative magnitudes of these voltage components are such that both the in-phase component supplied by transformer 7 and the peaked voltage supplied by transformer 13 are required to render valves 3 and 4 conductive. In this way the timer determines the cycles during which the valves conduct and the phase of the peaked voltages determine the time in the cycle that conduction is initiated. In the drawings, the primary of the transformer 13 has been shown as energized in accordance with the operation of the heat control 14 by means of which the phase adjustment of the peaked control voltage is obtained.

As will be well understood by those skilled in the art, the resistance welding system thus far described is placed in operation by closing the manual switch 12 whereupon the welding transformer 1 is energized for an interval or a succession of intervals under the control of the timer control 8 and with a current having a magnitude dependent upon the operation of the heat control designated by the numeral 14.

In accordance with one aspect of the present invention, we provide an improved circuit for obtaining an indication of the voltage across the work at the end of a weld period. As shown in Fig. 1 of the drawings, the indicating circuit includes a source of direct current control voltage impressed on conductors 15 and 16. This voltage may be derived from any suitable source and, as illustrated, is obtained from the alternating current supply circuit 1 by means of a transformer 17 having a midtapped secondary winding 18 connected with an electric discharge device 19 to provide a full wave rectifier. The output of the rectifier is filtered by a series reactor 20 and a parallel capacitor 21 to supply a substantially smooth direct current voltage. The voltage appearing across conductors 15 and 16 is regulated by the gaseous discharge devices 22 and 23 which are connected in series with one another and across capacitor 21 through a regulating resistor 24. These gaseous discharge devices are of a type well known in the art and have a predetermined minimum voltage of ionization which they operate to maintain by drawing variable amounts of current through the resistor 24.

The voltage appearing across conductors 15 and 16 is impressed on a series circuit including an indicating device such as an ammeter 25, a resistor 26 and the anode-cathode circuit of an electric valve 27. As illustrated the resistor 26 may be adjustable to provide a range adjustment for the meter 25. Electric valve 27 is preferably of the high vacuum type and includes a control member 28 which is energized in accordance with the voltage of a capacitor 29. The control member 28 is connected with the positive terminal of capacitor 29 through a current limiting resistor 30. The other terminal of capacitor 29 is connected with conductor 16.

The capacitor 29 is charged to a voltage depending upon the magnitude of the voltage across the work at the end of the weld period by means of a full wave rectifier including an electric discharge device 31 and a midtapped secondary winding 32 of a transformer 33 having a primary winding 34 thereof energized through conductors 35 and contacts 36 of relay 10 in accordance with the voltage across the welding electrodes 37, 38 which are in turn energized from the secondary winding of the welding transformer 1. The conductors 35 are secured in good electrical contact with the welding electrode 37, 38 as close to the ends thereof as mechanical considerations allow.

In order to permit capacitor 29 to charge readily to a value corresponding to the maximum instantaneous value of voltage across the welding electrodes during each cycle of each period of energization of the welding transformer, a path in shunt with the capacitor is provided which includes a series resistor 39 and the anode-cathode circuit of an electric valve 40. A control member 41 of this electric valve is energized with a negative bias component obtained from resistor 24 and during periods of energization of the welding transformer is energized with a positive component of voltage appearing across resistor 42. This resistor is in the output circuit of a rectifier including discharge device 43 and the secondary winding 32 of transformer 33. Thus the bias voltage across resistor 42 disappears when the load is deenergized, and the bias across resistor 24 maintains electric valve 40 biased to cut off so that the charge on capacitor 29 is maintained during each period of deenergization. When valve 40 is conducting it simply allows capacitor 29 to charge readily to a value corresponding to the peak value of voltage occurring across the welding electrodes 37, 38.

The indicating circuit including meter 25 energized from direct current source 15, 16 through electric valve 27 in accordance with the charge on capacitor 29 and the controlled discharge path in shunt to capacitor 29 and including resistor 39 and electric valve 40 have been claimed in our above-identified parent application, Serial No. 534,082 which, as pointed out above, is now Patent 2,440,932.

In addition to providing an indication of the maximum instantaneous value of voltage across the welding electrodes during the last half cycle of an energization period of the welding circuit, it is often desirable to provide a signal or to shut down the welder in the event that this voltage value departs from a preestablished value by a certain amount. In the embodiment of our invention illustrated in Fig. 1, this is accomplished by a signaling and lockout circuit responsive to variations in the conductivity of electric valve 27 which conducts current corresponding in magnitude to the magnitude of the charge on capacitor 29.

Since the voltage across the weld changes substantially during the weld period, it is essential that the lockout circuit provided be disabled until the end of the weld period so that the system will be locked out only if the voltage at that time is outside of the prescribed limits. Such an arrangement is shown in Fig. 1 and includes in addition to the initiating relay 10, relays 44, 45 and 46.

As shown in Fig. 1 an electric discharge valve 47 has the anode-cathode circuit thereof energized from a secondary winding 48 of the transformer 17 through a circuit including the operating coil 49 of a relay 44. In a similar manner, a second electric discharge valve 50 has the anode-cathode circuit thereof connected for energization from the secondary winding 51 of transformer 17 through a circuit including the operating coil 52 of a relay 45. Capacitors 53 and 54 are connected in shunt with the operating coils 49 and 52, respectively, to maintain the coils energized during the negative half cycles of voltage of the electric discharge valves 47 and 50. The cathodes of electric valves 47 and 50 are maintained at adjustable levels of voltage with respect to conductors 15 and 16 by conductors 55 and 56 which engage voltage dividing resistors 57 and 58 respectively. These voltage dividing resistors are energized in parallel from the direct current supply conductors 15 and 16. The control members of electric valves 47 and 50 are connected together through current limiting resistors 59 and to the cathode of electric valve 27 so that the voltage of the control members varies with variations in charge on the capacitor 29. The conductors 55 and 56 are adjusted so that electric valve 47 is conducting when the charge on the capacitor 29 is above the minimum value for a satisfactory weld. If the voltage of capacitor 29 drops below a level determined by the position of the conductor 55, electric valve 47 will not conduct and if it rises above a predetermined value determined by the conductor 56, electric valve 50 is rendered conducting. This operation of electric valves 47 and 50 and the resulting operation of relays 44 and 45 is employed to provide a visual indication that the weld is satisfactory or unsatisfactory, and to control the lockout circuit. In the arrangement illustrated this indication is provided by a lamp 60 which is connected for energization from the alternating current supply circuit 2 through a normally open contact 61 of relay 44 and a normally closed contact 62 of relay 45. Since relay 44 is energized and relay 45 is deenergized when the voltage across the weld is in the normal range for a satisfactory weld, lamp 60 will be illuminated at the end of each weld when the weld is satisfactory.

As previously mentioned, the value of the voltage across the weld may lie outside the desired range during a portion of the weld period and still lie within the range during the period which has been selected to indicate whether or not a satisfactory weld has been made. For this reason, it is necessary to prevent the lockout system from operating except when the system indicates that a bad weld has been made by the magnitude of the voltage of capacitor 29 at the end of the weld period. Referring now to Fig. 1, the initiating circuit of the timer 8 includes a normally open contact 9 of relay 10, the operating coil 11 of which is energized from the alternating current supply circuit 2 through initiating switch 12, a normally open contact 63 of lockout relay 46 and a conductor 64. Relay 10 also includes a normally open contact 36 which when closed completes the circuit of the primary winding 34 of transformer 33 and a contact 65 which when closed completes a circuit for the operating coil 66 of relay 46. An energizing circuit for the operating coil 66 of relay 46 is also completed through a parallel circuit including normally open contact 67 of lockout relay 46, normally closed contact 68 on relay 45 and a normally open contact 69 on relay 44. A manual switch 70 is provided for shunting contact 65 of relay 10 to pick up the lockout relay when the first weld is made.

In view of the above description it is obvious how the charge on capacitor 29 is continually varied during an energization period of the welder and has trapped thereon a charge corresponding in magnitude to the magnitude of the voltage across the welding electrodes during the last half cycle of the welding current flow. It is also obvious how this charge on capacitor 29 produces a corresponding indication on meter 25 which remains constant during the deenergization period following a period of energization of the welding circuit.

A brief description of the operation of the circuit will now be given to indicate how the lockout circuit is disabled except when the circuit indicates that a bad weld has been made by the value of voltage on capacitor 29 at the end of the weld. Since the energizing circuit of the operating coil 11 of relay 10 includes a normally open contact 63 of lockout relay 46, it is essential to energize relay 46 when the system is first placed in operation. This is accomplished by closing manual switch 70 which is allowed to remain closed during the first weld. Let it be assumed that this first weld has taken place and that the switch 70 has been opened and further that the capacitor 29 at the end of this first weld was charged to a voltage within the range indicating a satisfactory weld. Under these conditions electric valve 47 is conducting, relay 44 is energized, lamp 60 is illuminated and the operating coil of relay 46 is energized through a circuit including contact 67 of relay 46 and contacts 69 and 68 of relays 44 and 45. Contact 63 of lockout relay 46 remains closed and the welding circuit may be re-initiated by release and reclosure of contact 12. If, however, the voltage on capacitor 29 is sufficiently low, valve 47 remains non-conducting and contacts 61 and 69 remain open and if the charge on capacitor 29 is above a predetermined value, contacts 62 and 68 of relay 45 open, thus deenergizing the indicating lamp 60 and deenergizing the operating coil of lockout relay 46. Since the voltage on the capacitor which is to be used as an indication of the weld quality is the voltage at the end of the weld period, it is essential to prevent relay 46 from dropping out during the initial portion of the weld. This is accomplished by the parallel energizing circuit for the operating coil 66 including contact 65 of the initiating relay 10. With this circuit the voltage on capacitor 29 at the end of the weld period is the only voltage which is effective to lock out the welder by dropping out relay 46 since at any time prior to release of the starting switch 12, the lockout relay 46 is held in by the contact 65 of initiating relay 10.

In Fig. 2 of the drawings we have illustrated our invention as applied for determining the magnitude of the load or welding current at the end of the weld. In order to simplify this figure, the control circuits for electric valves 3 and 4 have been omitted and the circuits and relays for the signal and lockout circuits have also been omitted, although it is to be understood that they may form a part of the complete circuit.

In Fig. 2 parts corresponding to like parts of Fig. 1 have been identified by the same reference numerals. As in Fig. 1, the circuit for indicating the current supplied to the welding transformer during each period of energization includes an electric valve 27 the anode-cathode circuit of which is connected in series with a resistor 26 and an indicating device such as an ammeter 25. This series circuit is energized by the voltage appearing across conductors 15 and 16 which are energized with direct current voltage derived from the alternating current supply circuit 2 by an electric valve rectifier 71 and an energizing transformer 72. The output of the rectifier is filtered by a series reactor 73 and a shunt capacitor 74. Regulating discharge devices 22 and 23 and a resistor 24 are connected in series and across the capacitor 74. The conductivity of electric valve 27 is controlled by the charge on capacitor 29 which is connected between conductor 16 and the control member 28 of the valve 27 through a current limiting resistor 30. The capacitor is charged to a voltage depending upon the magnitude of the current supplied to the welding transformer, during each cycle of energization of the load circuit, by means of a full wave rectifier including an electric discharge device 31 and a midtapped secondary winding 32 of a transformer 33 having the primary winding 34 thereof energized from a current transformer 75 associated with one of the supply conductors of the welding transformer. A calibrating resistance 76 may be connected in shunt with the current transformer. In order to permit capacitor 29 to charge readily to a value corresponding to the maximum instantaneous value of current supplied to the welding transformer during each cycle of each period of energization, a path in shunt with the capacitor is provided which includes a series resistor 39 and the anode-cathode circuit of an electric valve 40. A control member 41 of the electric valve is energized with a negative bias component obtained from resistor 24 and during periods of energization is energized with a positive component of voltage appearing across resistor 42. This resistor is in the output circuit of a rectifier including discharge device 43 and the secondary winding 32 of transformer 33. Thus as in Fig. 1 the bias voltage across resistor 42 disappears when the load is deenergized, and the bias across resistor 24 maintains electric valve 40 biased to cutoff so that the charge on capacitor 29 is maintained during each period of deenergization. When valve 40 is conducting, it simply allows capacitor 29 to charge readily to a value corresponding to the peak value of current supplied to the load circuit.

From the foregoing description it is apparent that in the circuits above described, the indication provided is not rendered difficult to utilize when the periods of deenergization occur at rather close intervals as they may in seam or pulsation spot welding. In each case the reading of the indicating instrument is adjusted during each period of energization and is maintained during the succeeding periods of deenergization at a value dependent upon the voltage or current condition existing during the last cycle of the preceding period of energization. This is a particularly desirable feature in the arrangement of Fig. 1 since the value of voltage across the weld at the time the weld is completed is a good indication of the weld quality.

While we have shown and described particular embodiments of our invention, it will be obvious to those skilled in the art that changes and modifications may be made without departing from our invention in its broader aspects, and we therefore aim in the appended claims to cover all such changes and modifications as fall within the true spirit and scope of our invention.

What we claim as new and desire to secure by Letters Patent of the United States, is:

1. In combination, an electric circuit, means electrically connected with said circuit for supplying timed applications of alternating current to said circuit, a capacitor, means electrically connected with said circuit for charging said capacitor to a voltage dependent upon the maximum instantaneous value of an electrical condition of said circuit during half cycles of voltage of said circuit, a discharge path connected electrically in parallel with said capacitor and including an electric valve having a control member, and means connected in circuit with said control member of said electric valve for energizing said control member to render said discharge path conductive only during periods of energization of said circuit so that the charge on said capacitor may be adjusted in either direction as the magnitude of said electrical condition of said electric circuit varies and for maintaining the charge on said capacitor during periods of deenergization of said electric circuit.

2. In combination, an electric circuit, means electrically connected with said circuit for supplying timed applications of current to said circuit, a capacitor, means electrically connected with said circuit for charging said capacitor to a voltage dependent upon the maximum instantaneous value of an electrical condition of said circuit during each application of current to said circuit, a discharge path electrically connected in parallel with said capacitor and including an electric valve having a control member, and means connected in circuit with said control member of said electric valve for energizing said control member to render said discharge path conductive only during periods of energization of said load circuit so that the charge on said capacitor may be adjusted in either direction as the magnitude of said electrical condition of said electric circuit varies and for maintaining the charge on said capacitor during periods of deenergization of said electric circuit to maintain the charge on said capacitor at a value dependent upon the magnitude of said condition during the latter portion of each application of current to said circuit.

3. In combination, a load circuit, means electrically connected with said load circuit for supplying timed applications of alternating current to said load circuit, a capacitor, means electrically connected with said load circuit for charging said capacitor to a voltage dependent upon the maximum instantaneous value of an electrical condition of said load circuit during each cycle of voltage of said load circuit, a controlled circuit connected electrically in parallel with said capacitor, and means electrically connected with said load circuit for controlling conduction in said controlled circuit to permit discharge of said capacitor therethrough only during periods of energization of said load circuit so that the charge on said capacitor is adjusted in either direction as the magnitude of said condition of said load circuit varies and for maintaining a charge on said capacitor during periods of deenergization of said load circuit dependent upon the maximum instantaneous value of said condition occurring during the last cycle of energization of said load circuit.

4. In combination, an alternating current supply circuit, a load circuit, means electrically connected between said circuits for supplying timed applications of alternating current to said load circuit, a capacitor, means electrically connected with said load circuit for charging said capacitor to a voltage dependent upon the maximum instantaneous value of current supplied to said load circuit during half cycles of voltage of said supply circuit, a discharge path connected electrically in parallel with said capacitor and including an electric valve having a control member, and means connected in circuit with said control member of said electric valve for energizing said control member to render said discharge path conductive only during periods of energization of said load circuit so that the charge on said capacitor may be adjusted in either direction as the magnitude of the current of said load circuit varies and for maintaining the charge on said capacitor during periods of deenergization of said load circuit at a value dependent on the load current during the last of said half cycles.

5. In combination, an alternating current supply circuit, a load circuit, means electrically connected between said circuits for supplying timed applications of alternating current to said load circuit, a capacitor, means electrically connected with said load circuit for charging said capacitor to a voltage dependent upon the maximum instantaneous value of voltage of said load circuit during half cycles of voltage of said supply circuit, a discharge path connected electrically in parallel with said capacitor and including an electric valve having a control member, and means connected in circuit with said control member of said electric valve for energizing said control member to render said discharge path conductive only during periods of energization of said load circuit so that the charge on said capacitor may be adjusted in either direction as the magnitude of the voltage of said load circuit varies and for maintaining the charge on said capacitor during periods of deenergization of said load circuit at a value dependent on the load voltage during the last of said half cycles.

6. In combination, an alternating current supply circuit, a load circuit, means electrically connected between said circuits for supplying timed applications of alternating current to said load circuit, initiating means for operating said last mentioned means, a capacitor, means electrically connected with said load circuit for charging said capacitor to a voltage dependent upon the maximum instantaneous value of an electrical condition of said load circuit during each cycle of voltage of said supply circuit, a controlled circuit connected electrically in parallel with said capacitor, means electrically connected with said load circuit for controlling conduction in said controlled circuit to permit discharge of said capacitor therethrough only during periods of energization of said load circuit so that the charge on said capacitor is adjusted in either direction as the magnitude of said electrical condition of said load circuit varies and for maintaining the charge on said capacitor during periods of deenergization of said load circuit at a value dependent upon the magnitude of said electrical condition during the last cycle of energization of said load circuit, means electrically connected to be responsive to the voltage of said capacitor for preventing operation of said initiating means resulting in a second timed application of current to said load circuit when the value of said condition departs from a predetermined magnitude by a predetermined amount, and means electrically connected with said last mentioned means by operation of said initiating means for preventing operation of said last mentioned means except when operation is indicated by the voltage of said capacitor attained during said last cycle of energization.

BENJAMIN COOPER.
CHARL D. CILLIÉ.

REFERENCES CITED

The following references are of record in the file of this patent:

UNITED STATES PATENTS

| Number | Name | Date |
|---|---|---|
| 2,143,219 | Wenger | Jan. 10, 1939 |
| 2,190,514 | Garman | Feb. 13, 1940 |
| 2,374,044 | Smith | Apr. 17, 1945 |
| 2,385,736 | Smith | Sept. 25, 1945 |
| 2,392,632 | Berry | Jan. 8, 1946 |
| 2,395,849 | Collom | Mar. 5, 1946 |
| 2,405,069 | Tonks | July 30, 1946 |
| 2,466,705 | Hoeppner | Apr. 12, 1949 |